Patented Sept. 30, 1924.

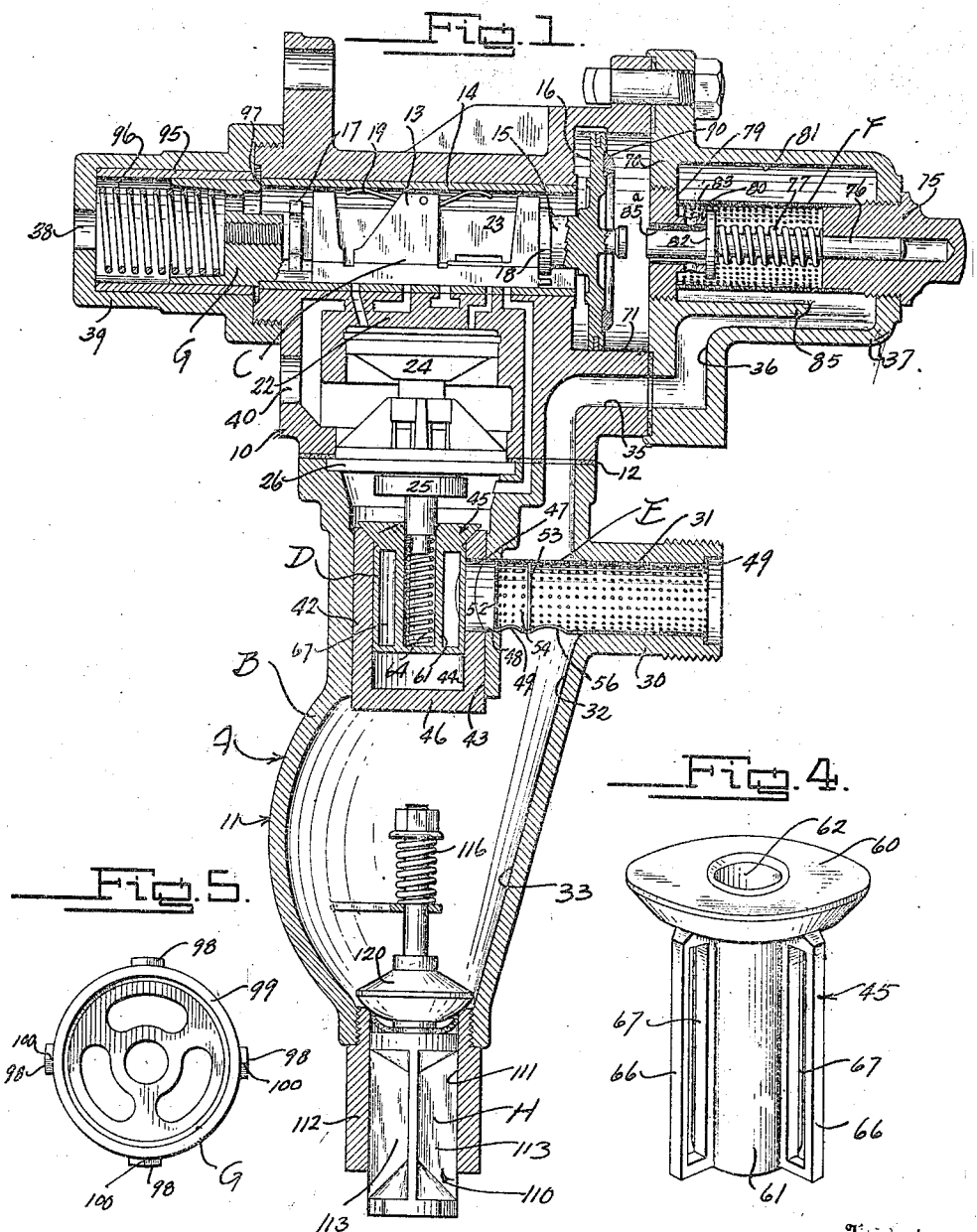

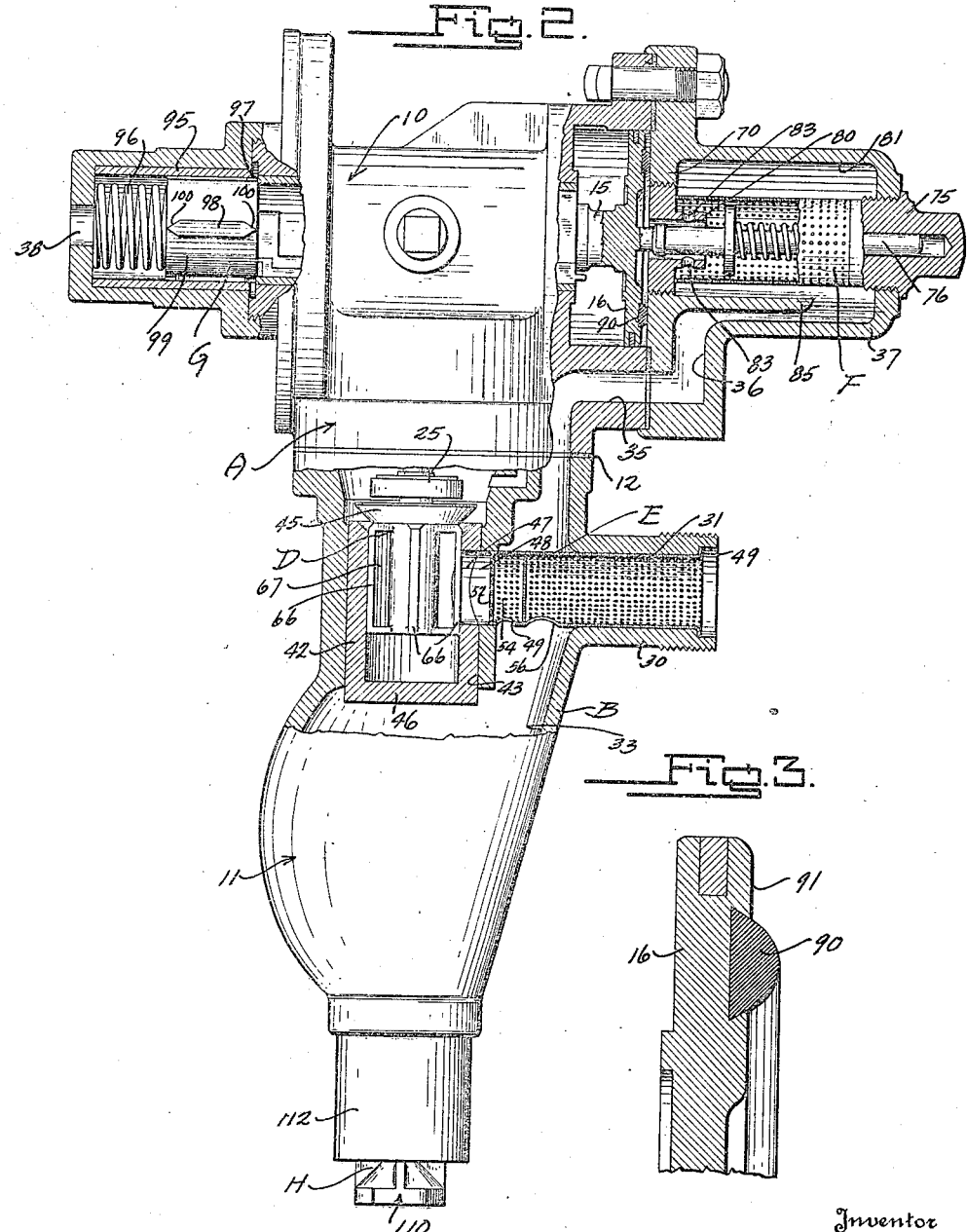

1,510,225

UNITED STATES PATENT OFFICE.

ELLIS M. HOWARD, OF OVIEDO, FLORIDA.

TRIPLE VALVE FOR AIR-BRAKE SYSTEMS.

Application filed April 27, 1923. Serial No. 635,008.

*To all whom it may concern:*

Be it known that I, ELLIS M. HOWARD, a citizen of the United States, residing at Oviedo, in the county of Seminole and State of Florida, have invented certain new and useful Improvements in Triple Valves for Air-Brake Systems, of which the following is a specification.

This invention relates to improvements in control valves for the air brake systems of railroad rolling stock.

The primary object of this invention is the provision of improvements in the triple valve mechanism used for the control of air brakes, particularly directed to the feature of excluding dust, pipe scale, sand, cinders and other foreign materials or particles from the vital working parts of the same, and making provision for the automatic discharge of such undesirable foreign elements.

A further object of this invention is the provision of an improved type K triple valve, such as is manufactured by the Westinghouse Air Brake Company of Pittsburgh, Pennsylvania, embodying improved features which will materially extend the life of the valve, effect a material saving in so far as maintenance expense is concerned, and prevent various destructive influences upon said triple valve such as are well known to those skilled in the art to which this invention relates.

A further object of this invention is the provision of a triple valve of the above mentioned character which embodies novel means for directing air from a brake pipe into the check valve construction thereof without the necessity of directing the air travel through the compartment in which foreign materials collect.

A further object of this invention is the provision of a novel straining device, which may be used at the air inlet or brake pipe connection of the triple valve, which will very effectively strain and deflect foreign materials from air travelling into the valve, and so control said foreign materials that the same will be deflected into a discharge compartment where they will not be disturbed by air currents or the like.

A further object of this invention is the provision of novel straining and deflecting means for use in the cylinder cap of a triple valve of the type above mentioned, which will thoroughly baffle and drain from a body of air travelling therethrough all of the defective foreign materials, preventing the same from reaching the graduating spring or stem ordinarily contained within the cylinder cap and obviously preventing said foreign materials from access to the sensitive valve parts and retarding device of the triple valve.

A further object of this invention is the provision of a retarding device for triple valves of the above mentioned character which is self cleaning and so constructed that the same may reciprocate without liability of sticking.

Other objects and advantages of this invention will be apparent during the course of the following detailed description.

In the accompanying drawings, forming a part of this specification, and wherein similar reference characters designate corresponding parts throughout the several views, Figure 1 is a vertical cross sectional view taken through a type K triple valve for air brake systems, showing certain standard or conventional features of construction thereof, and the improved features of construction as outlined in the objects of this invention and subsequently described in detail.

Figure 2 is a fragmentary side elevation, showing improved features of this invention.

Figure 3 is an enlarged fragmentary cross sectional view, taken through the piston head of the main piston as embodied in triple valves of the type described, showing an improved feature thereof.

Figure 4 is a perspective view of a novel type of check valve used in connection with the improved triple valve device.

Figure 5 is an end elevation of a novel stop member used as a part of the retarding device.

In the drawings, wherein for the purpose of illustration is shown but the preferred embodiment of this invention, the letter A may generally designate the improved triple valve, which includes a housing B altogether analogous to the standard body construction of triple valves as now manufactured; conventional valve mechanism C found in triple valves of the class described, for controlling air pressures for different applications of the brakes; novel check valve mechanism D; means E for straining air entering the housing B; novel means F used within the cylinder cap of the housing for the exclusion of foreign materials from the sensitive valve parts; a novel retarding device G; and a device H, such as described in my copending application, Serial No. 635,007 filed April 27, 1923, for the automatic discharge of any collected foreign materials, such as dust, pipe scale, and the like, the same being operable by pressure variation as described in said copending application.

Referring to the construction of the housing B, as above mentioned, the same is of the standard or conventional construction such as is shown by the type K of Westinghouse triple valve and preferably includes a valve body 10 and check valve case 11, connected in the conventional manner with the gasket 12 therebetween. The valve mechanism C is for the most part contained in the valve body 10, and includes the slide valve 13 which is reciprocably mounted on a horizontal bushing 14 in the upper end of the valve body 10, the same being connected in the well known manner upon the graduated valve 23 of the main piston 16 for limited movement along said valve intermediate the flanges 17 and 18 so that the slide valve spring 19 normally engages the bushing to urge the slide valve 13 into engagement with the bottom of the bushing 14, which is provided with various ports in aligning relation with the ports of the portion 22 of the valve body 10 immediately below the slide valve. The slide valve 13 of course cooperates with the graduating valve 23 provided rigid with the piston stem 15. The emergency piston 24 of the conventional construction is provided for vertical reciprocation within the portion 22 of the valve body 10, an emergency valve 25 of the well known construction being provided rigid on the stem of the emergency piston 24 for movement therewith and for cooperation with the emergency valve seat 26 just upwardly of said emergency valve.

Referring to certain well known features of construction of the triple valve housing B, as connected in the air brake system, the check valve case 11 provides an externally screw threaded extension 30 laterally thereof, just below the connection of the valve body 10 and check valve case 11, the same providing an air inlet opening 31 through which air passes from the brake pipe (not shown) into the upper part 32 of a compartment 33 provided in the depending bulbular end of the check valve case 11. Upwardly of the part 32 of the compartment 33, a passageway 35 leads through the connected housing parts 10 and 11 into a passageway 36 of a cylinder cap 37, as will be subsequently described. A passageway 38 is preferably provided at the end of the retarding device body 39 through which air pressure may pass from the auxiliary reservoir to the chamber in which the slide valve 13 operates, and vice versa, to effect well known applications of air brakes and the like. A passageway or port 40 is provided in the valve body 10 through which air pressure may flow from the triple valve to the brake cylinder for application of the brakes, or may pass from the brake cylinder through the triple valve and thence to the atmosphere when the brakes are released.

As the functions which the valve mechanism of the type K of triple valve perform in connection with an air brake system are well known, no detailed discussion of these well known functions will be given, but the description confined to improvements upon the triple valve. As is well known to those skilled in the art to which this invention relates, air pressure from the brake pipe entering the compartment in the conventional triple valve will pass vertically upward into the check valve bushing, so that dust and foreign material collected within the compartment is agitated and carried into the vital working and relatively movable parts of the check valve and slide valve. To obviate this, the check valve construction D has been so designed that the air travel from the brake pipe does not have to pass through the compartment 33. To this end, a cylindrical shaped bushing or plug 42 has been provided, which is adapted for fixed disposition within the seat 43 provided in the check valve case 11, providing a chamber 44 therein for vertical reciprocation of the novel check valve 45. The plug or bushing 42 provides a solid bottom wall 46 immediately above the compartment 33, and has an opening 47 in a side wall thereof, in alignment with an opening 48 in the side wall of the seat 43, both of said openings 47 and 48 being in alignment with the air inlet opening 31 and having a common axis therewith. The air thus may flow or travel directly through the inlet opening 31 from the brake pipe (not shown) and flow into the check valve chamber 44 for action upon said check valve as will be subsequently described.

The strainer E is provided in the entrance passageway 31, the same preferably being formed of any approved material, such as brass, and having minute perforations therein for the passage of air into the housing B. It is preferred that the outer end of the strainer E be entirely open and outwardly annularly flanged, as at 49, for resting within the annular seat at the outer end of the inlet nipple 30. The strainer E is of sufficient length that the same extends into the upper end 32 of the compartment 33, and the most inner end thereof is disposed in the opening 48 of the check valve seat 43. At its extreme end, the strainer E is provided with a fine mesh screen or strainer wall 52, and within the strainer 31 and in spaced parallel relation with the wall 52, a screen or partition wall 53 is provided which may have perforations therein relatively larger than the perforations in the fine strainer wall 52. Intermediate the walls 52 and 53, a compartment or chamber 54 is provided, which has a relatively large exit opening 49 facing the lower compartment 33, thru which any dust or foreign materials may drop having been baffled within said chamber 54 and strained from the air travelling into the chamber 44. Upon the inlet side of the partition wall 53 and in the bottom of the strainer 31, an exit opening 56 is provided, facing the lower compartment 33, and through which sediment, such as dust and pipe scale may drop after having been deflected from the course of air travel within the strainer 31 intermediate the inlet end thereof and the partition wall 53. It is thus apparent that any dust and dirt which has been baffled or deflected from the course of air travel by the strainer E may readily drop from said strainer out of the path of air travel into the compartment 33 and be automatically discharged from the housing B as will be subsequently described. This is a material advantage over the present strainer used at the inlet end of the triple valve check case, as the air strainer which is in conventional use in such location merely collects dust, and foreign material therein, either retaining the same until it is ground fine enough to pass through the strainer, or until the same provides a sufficient obstruction to blow out the strainer and thus permit the entire body of dust and foreign material to enter the vital working parts of the valve mechanism. It is apparent that this destructive influence has been removed by the provision of the strainer E, and by the direct course of air travel which avoids the dust collecting compartment 33.

Referring to the novel construction of the check valve 45, the same preferably provides the frusto-conical valve head 60, having the cylindrical hollow stem 61 depending therefrom, which is provided with a chamber 62 opening through the top of the valve head 60 to receive the spiral spring 64, which as is well known engages the emergency valve stem which is reciprocably disposed within the chamber 62 and normally urges the check valve into its valve seat or plug 42, substantially as is illustrated in Figures 1 and 2 of the drawings. Laterally or radially extending guide flanges 66 are provided on the hollow cylindrical portion 61 of the check valve 45, which are transversely slotted, as at 67, longitudinally thereof, whereby air entering the check valve chamber 44 may be dispersed uniformly about the cylindrical stem 61 to exert a uniform upward lift upon the valve head 60, as is obvious.

Referring to the cylindrical cap 37 and its associated details of the improved triple valve, the same is attached in the conventional manner to the valve body 10, and provides a wall 70, which faces the chamber 71 within which the main piston head 16 reciprocates. The cylindrical cap 37 adjustably supports the graduating stem nut 75, which slidably receives the graduating stem 76, which is arranged axially of the cylinder cap 37 and is normally urged by a compression spring 77 toward the piston 16. As a novel element of the cylinder cap construction, a detachable cap plug 79 has been provided for detachably screw threading in the inside cylinder cap wall 70, which provides a reduced annular extension 80 projecting into the cylinder cap chamber 81, which receives the stop flange 82 of the graduating stem 76, to limit the amplitude of movement of the graduating stem into the piston chamber 71. To permit air to enter the piston chamber 71, the reduced extension 80 of the novel plug 79 is provided with lateral openings 83 therein, which communicate the cylinder chamber 81 with the passageway 85$^a$ extending through the plug 79. The end of the graduating stem 76 which operates in the passageway 85$^a$ is relatively smaller in diameter than said passageway 85$^a$ so that air may freely pass through the cylinder cap passageway 36 into the graduating stem chamber 81 thereof, and thence into the piston chamber 71.

A cylindrical shaped strainer F is mounted upon the inner end of the graduating stem plug 75, having the ends thereof open, one end of which fits over said plug 75, and the other end of which abuts the inside surface of the plug 79 and receives the reduced end 80 therein. In this manner the graduating stem, its spring, and the communicating ports between the cylinder cap chamber 81 and the piston chamber 71 are enclosed within the perforate strainer F, so that dust and foreign materials may be prevented from access to the graduating stem parts and be deflected so that they may not enter the slide valve or piston chambers. A novel feature of the cylinder cap 37 is the provision of the ledge or baffle partition 85, within the cylinder chamber 81, just below the strainer F, so that air passing upwardly through the passageway 36 will be baffled thereagainst, and deflect dust and other foreign particles. Foreign material, such as dust, pipe scales and the like collected within the cylinder chamber 81 will drop by vibration, gravity, or back pressure, into the collecting compartment 33 of the check valve case 11 and be discharged automatically by the device H.

In the conventional type K triple valve, a leather gasket is used over the piston chamber facing surface of the cylinder cap wall 70 against which the main piston head 16 abuts when the valve details are in position for an emergency application of the brakes. This gasket, which forms a conventional part of the Westinghouse triple valve, is of leather construction and to maintain the same in pliable condition to perform its function properly, the same is saturated in lubricating oil. Contact of the piston head 16 with this type of gasket, causes some of the oil to adhere to the piston head, about the piston ring provided thereon, and in a great many instances the oil works its way into sensitive parts of the triple valve, corroding the same, and in short time rendering the same unfit for use. To do away entirely with the necessity of providing such a gasket, and so that graphite may be used as a lubricating material, instead of any corroding oil, a novel type of sealing ring 90 has been provided, which in cross section is segmental, and which is annularly dove tailed in the side 91 of the piston head 16, which faces the cylinder cap wall 70. This ring 90 is preferably of rubber and provides a convex surface projecting laterally for its entire circumference from the piston face 91 to perform in more effective and economical manner the function formerly provided by the gasket above referred to.

A further and very important improvement in the triple valve is that of the provision of the novel retarding stop G. This stop G, which is hollow cylindrical in formation and open at both ends thereof, cooperates in identically the same manner with the slide valve and graduating valve as in the conventional triple valve construction, although the same is of different construction from the conventional retarding stop in that the same may operate more effectively and prevent binding thereof. This retarding stop G is reciprocably disposed within a bushing 95, carried in the retarding device body 39, and is normally urged forwardly toward the slide valve 13 by means of a compression spring 96, being limited in its forward movement by a shoulder 97 of the valve body 10.

Referring to the retarding stop 95, ribs 98 are longitudinally provided upon the circumference 99 thereof, which are of a nature to slidably engage the sliding surface of the bushing 95, so that the circumference 99 of the retarding device 95 is spaced from said sliding surface of the bushing 95. By this construction, there will be but limited frictional contact of the retarding device G, within its bushing 95. The ends of each of the ribs 98 are pointed, as at 100, so that any settlement of foreign material on the sliding surface of the bushing 95 may be warded off therefrom as the retarding device stop G slides along said bushing, so that there will be no liability of any foreign particles slipping intermediate the translation surfaces of the ribs 98 and the bushing 95, as to have an abrasive effect thereon. The disadvantages inherent in the present type of retarding device employed on triple valves is well known to those associated with practical use of the same. They occasionally stick within their bushings so that the slide valves cannot work effectively incident to pressure variation, and it is not unusual that the triple valve causes an emergency application of the brakes when it is not intended to do so, causing the wheels of rolling stock to lock and slide over the rails upon which they are travelling, causing what is known as "flat" wheels. The triple valve very often goes into release so that the brakes will not apply at all, all of which is incident to sticking of the retarding device as above mentioned. It is apparent that by the use of the retarding device, such as herein described, there will be no liability of sticking in its bushing, as the same is self cleaning, provides very little frictional contact with its bushing, and operates in identical manner with the slide valve in so far as the conventional retarding device is concerned.

Referring to the device H, which is as above referred to as fully set forth in my copending application, Serial No. 635,007 filed April 27, 1923, the same preferably includes a plunger member 110, reciprocably carried within a discharge passageway 111 of a plug 112, which may be detachably carried in the lower end of the check valve case 11; said plunger member providing various pockets 113 therein. When pressure is low within the compartment 33, a spring 116 normally acts to draw the plunger 110 upward in its passageway 111 so that the pockets 113 may receive dust and foreign material collected within the compartment 33. Upon sufficient pressure within the compartment 33, the plunger device 110 is moved outwardly of its plug 112, so that the pockets may exteriorly deposit their contents. In this position, a valve 120 provided as a part of the device H seats over the discharge passageway 111 to seal the compartment 33 against atmospheric communication so that any pressure may be maintained therein.

From the foregoing description of this invention it is apparent that the Westinghouse type K of triple valve has been improved upon in numerous instances, the primary object of all improvements described herein being the segregation of dust and other foreign particles so that the same may be prevented from reaching the vital parts of the valve mechanism, and especially the sliding valve mechanism. With the improvements herein set forth, a triple valve may function over a period materially in excess of the conventional triple valve without necessity of overhauling the same, and as the dust and foreign materials are effectively segregated and discharged, the sliding faces of the control valve and its bushing do not have to be reground with the frequency now necessary. In addition to the saving of maintenance expense and the extension of usefulness of a triple valve, the working parts thereof may so effectively perform their function as to obviate danger to the lives of those associated with the working of the air brake system. As the discharge plunger member H makes provision for the drain of water therefrom, as is set forth in my copending application above referred to, there will be no liability of freezing of water in the check valve to the deterioration of the same.

Various changes in the shape, size and arrangement of parts may be made to the form of invention herein shown and described without departing from the spirit of the invention or the scope of the claims.

I claim:

1. In combination with an air brake triple valve including a housing providing a compartment having an opening therein through which air under pressure flows into the compartment, of a strainer over said opening adapted to collect dust and foreign material from the air passing into said compartment, said strainer having an opening therein through which collected dust and foreign material may fall out of the path of air travel.

2. In combination with an air brake triple valve including a housing providing a compartment having an opening therein through which air under pressure flows into the compartment, of a strainer over said opening adapted to collect dust and foreign material from the air passing into said compartment, said strainer having an opening therein through which collected dust and foreign material may fall out of the path of air travel, and means in said compartment for receiving said collected dust and foreign material after falling from the opening of said strainer and automatically discharging the same from said compartment.

3. In a device of the class described, the combination with a housing having an air pressure inlet opening therein and providing a compartment below said inlet opening, of a valve, means receiving said valve in the housing so that the path of air travel from the inlet opening to said valve avoids passing through said compartment, strainer means across the path of air travel, adapted to deflect dust and foreign materials from the path of air travel into said compartment, and means for removing collected dust and foreign material from said compartment.

4. In a device of the class described, the combination with a housing having an air pressure inlet opening therein and providing a compartment below said inlet opening, of a valve, means seating the valve in the housing so that air passing from said air pressure inlet opening for action upon said valve travels over a straight path directly to said valve avoiding the compartment below said inlet opening, strainer means across the path of air travel adapted to deflect dust and foreign materials from the path of air travel into the compartment, and means for removing collected dust and foreign material from said compartment.

5. In a triple valve mechanism for air brakes the combination of a housing having an air inlet opening therein and a dust collecting compartment below the opening, of a valve, and means movably mounting the valve in the housing above said compartment and providing a lateral opening in such relation to the inlet opening of the housing that the air may travel direct from the inlet opening of the housing to the opening of said valve mounting means for action on the valve to prevent air travel through the dust collecting compartment.

6. In a triple valve mechanism for air brake systems the combination of a housing having an air inlet opening therein, and a dust collecting compartment below the opening, of a valve, means movably mounting the valve in the housing above said compartment and providing a lateral opening in such relation to the inlet opening of the housing that the air may travel direct from the inlet opening of the housing to the opening of said valve mounting means for action on the valve to prevent air travel through the dust collecting compartment, and a strainer disposed over said air inlet opening of the housing for passage of air therethrough and adapted to deflect dust and foreign material from air entering the housing so that the same will fall into said compartment out of the path of air travel.

7. As an article of manufacture, a dust strainer of the class described comprising a perforate body having an inlet opening in one end thereof and a second opening out of alignment with said inlet opening through which material collected in said body may drop.

8. As an article of manufacture, a strainer device of the class described comprising a cylindrical shaped perforate body providing an air inlet opening, and perforate walls in said body, said body having openings therein adjacent said perforate walls through which dust and foreign material may fall after deflection from said body and perforate walls.

9. A triple valve of the class described comprising a housing having an air pressure inlet opening therein, and providing a compartment below said air inlet opening, a check valve, and means seating said check valve in said housing so that air entering the housing may pursue a path directly to said check valve to avoid the compartment below the air inlet opening.

10. As an article of manufacture, a check valve of the class described comprising a valve head, and guide flanges extending from a side of said valve head providing openings transversely therethrough.

11. As an article of manufacture, a check valve of the class described comprising a frusto-conical valve head, a hollow cylindrical stem depending from a side of said valve head, and guide flanges radially extending outwardly from the circumference of said valve stem providing elongated slots transversely therethrough.

12. In a triple valve mechanism, the combination with a housing providing an air pressure inlet opening therein and a compartment below said air inlet pressure opening for the collection of dust and foreign materials, of a check valve, and means for movable seating of the valve in said housing providing a bottom wall facing said compartment and a side opening in substantial alignment with the air inlet opening whereby air entering the housing may act upon said valve through the opening in said seating means so that air may not be forced to travel downwardly toward the compartment in which dust and foreign material collects.

13. In a triple valve mechanism, the combination with a housing providing an air pressure inlet opening therein, and a compartment below said air inlet pressure opening for the collection of dust and foreign materials, of a check valve, means for movably seating of the valve in said housing providing a bottom wall facing said compartment, and a side opening in substantial alignment with the air inlet opening whereby air entering the housing may act upon said valve through the opening in said seating means so that air may not be forced to travel downwardly toward the compartment in which dust and foreign material collects, and a strainer arranged over the air pressure inlet opening of the housing for straining of dust and foreign material from air entering the housing and to deflect the same into said compartment.

14. In a triple valve mechanism, the combination with a housing providing an air pressure inlet opening with a dust collecting compartment therebelow, of a check valve, a valve seat of hollow cylindrical formation providing a solid bottom wall carried by said housing with the bottom wall facing said compartment, said plug and housing providing openings in substantial alignment with the air pressure inlet opening whereby air passing into the housing may act upon the valve without distorting the path of air travel toward said compartment, and means for automatic discharge of dust and foreign material from said compartment.

15. In a triple valve mechanism, the combination with a housing providing an air pressure inlet opening and a dust collecting compartment therebelow, of a check valve, means reciprocably seating the check valve in the housing for vertical movement, said means providing air ports into which the air from the air inlet opening of the housing may enter without deflecting the air toward said compartment, a cylindrical shaped strainer carried within said air inlet opening of said housing and extending into the air ports of said means, perforate partition walls carried by said strainer adjacent said check valve for the deflection of dust and foreign material from air prior to entrance into said check valve, said strainer having openings facing said compartment and disposed adjacent said perforate walls whereby dust and foreign materials deflected from said perforate walls may fall through said openings into said compartment.

16. In a triple valve mechanism for air brake systems the combination of a housing having an air inlet opening therein, and a dust collecting compartment below the opening, of a valve, and means movably mounting the valve in the housing above said compartment and providing a lateral opening in such relation to the inlet opening of the housing that the air may travel direct from the inlet opening of the housing to the opening of said valve mounting means for action on the valve to prevent air travel through the dust collecting compartment, and a strainer disposed over said air inlet opening of the housing for passage of air therethrough and adapted to deflect dust and foreign material from air entering the housing so that the same will fall into said compartment out of the path of air travel, and automatically operable means arranged in said compartment for the discharge of dust and foreign material from said compartment.

17. A cylinder cap for air brake control valves including a body having air inlet and outlet openings therein, and a strainer device over said outlet opening.

18. A cylinder cap for air brake control valves comprising a body, a graduating stem, a graduated stem nut, and a perforate strainer supported by said nut enclosing the graduated stem therein and disposed over an outlet opening in said body whereby dust and foreign material may be prevented from access to the graduated stem and outlet opening.

19. A cylinder cap construction for triple valves comprising a body providing a chamber therein and an air inlet opening, a ledge disposed over said air inlet opening intermediate the same and said chamber against which air entering the chamber must impinge for the baffling of dust and foreign material, a graduating stem, a graduating stem nut carried by one end of said body, a plug carried by the other end of said body providing outlet openings therethrough, spring means supporting the graduated stem and urging the same toward said plug, and a perforate strainer carried by said graduating stem nut enclosing the graduated stem and outlet openings of said plug.

20. In a triple valve mechanism, the combination of a housing providing an air inlet opening therein and a dust collecting compartment therein, a cylinder cap on said housing having a chamber therein and a passageway communicating said chamber with the air pressure inlet of said housing, a baffle ledge within said chamber of the cylinder cap across said passageway, a graduating stem, a graduating stem nut carried by said cylinder cap, a plug detachably carried at an end of said cylinder cap opposite said nut providing outlet passageways therein, and a cylindrical shaped perforate strainer carried by said nut enclosing the graduated stem therein and extending across the outlet passageways for the deflection of dust and foreign material into said chamber whereby the same may fall ultimately into the compartment of said housing.

21. In a triple valve mechanism for air brake systems, the combination with a housing, a slide valve within the housing, a piston for control of said slide valve, a cylinder cap providing a solid wall for cooperation with said piston, and a resilient ring carried by said piston in facing relation with the wall of said cylinder cap and adapted for direct contact therewith upon a certain application of said slide valve.

22. As an article of manufacture, a piston for triple valves comprising a body provided with a dove-tailed annular groove inwardly of a face thereof, and a resilient gasket ring dove tailed within said dove tailed groove and projecting outwardly of the face of said piston.

23. As an article of manufacture, a retarding device member providing ribs upon the outer surface thereof.

24. As an article of manufacture, a retarding device stop having ribs upon the outer surface thereof provided with pointed ends.

25. As an article of manufacture, a retarding device stop for triple valves providing a cylindrical shaped body portion having ribs extending outwardly of the outer circumference thereof, the ends of said ribs being pointed in the direction of the ends adjacent said points.

26. In a triple valve device, the combination of a housing including a slide control valve, and a retarding device carried by said housing including a body connected to the housing, a retarding device stop reciprocably disposed within said body, and spring means operating upon said stop to urge the same toward the slide valve, said retarding device stop providing ribs upon the outer surface thereof for sliding contact against the body which supports the same.

27. In a triple valve for air brake systems, the combination of a housing providing an air control valve therein, and a retarding device for cooperation with said valve providing a self cleaning movable stop.

28. A triple valve for air brake systems comprising a housing having an air pressure inlet opening therein and a dust collecting compartment therebelow, a check valve reciprocable within the housing, means mounting said check valve so that air may travel from the air inlet opening direct to said check valve without necessity of passing into said compartment, means in the lower end of said compartment operable by variation in pressure within the same for discharge of dust and foreign material from the compartment, a cylinder cap providing a chamber therein, passageways communicating the compartment of the housing with the chamber of said cylinder cap, a graduating stem resiliently supported in the cylinder cap, said cylinder cap having an outlet opening therein, strainer means over the air inlet opening of said housing for filtering of dust and foreign material from air entering the same and including means for deflecting the same into the dust collecting compartment, a baffle ledge in the cylinder cap chamber against which air entering the same impinges to deflect dust and foreign material, a strainer member enclosing the graduating stem and disposed across the outlet opening of the cylinder cap, a slide valve operating for control of air pressure in the triple valve, a piston cooperating with said slide valve, a resilient ring carried by said piston in facing projecting relation toward its adjacent wall of said cylinder cap in which the outlet opening of said cylinder cap is provided, and a retarding device for cooperation with said slide valve including a retarding device stop member having self cleaning slide ribs upon the outer circumference thereof.

ELLIS M. HOWARD.